(12) United States Patent
Fang et al.

(10) Patent No.: US 11,709,385 B2
(45) Date of Patent: Jul. 25, 2023

(54) ELECTRONICALLY-CONTROLLED VIEWING ANGLE SWITCHING DEVICE AND DISPLAY DEVICE

(71) Applicant: Coretronic Corporation, Hsin-Chu (TW)

(72) Inventors: Chung-Yang Fang, Hsin-Chu (TW); Ping-Yen Chen, Hsin-Chu (TW); Yang-Ching Lin, Hsin-Chu (TW); Jen-Wei Yu, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 21 days.

(21) Appl. No.: 16/940,401

(22) Filed: Jul. 28, 2020

(65) Prior Publication Data

US 2021/0048696 A1 Feb. 18, 2021

(30) Foreign Application Priority Data

Aug. 14, 2019 (CN) .......................... 201910748129.3

(51) Int. Cl.
*G02F 1/13* (2006.01)
*G02F 1/1335* (2006.01)
*G02F 1/13363* (2006.01)

(52) U.S. Cl.
CPC ...... *G02F 1/1323* (2013.01); *G02F 1/133502* (2013.01); *G02F 1/13363* (2013.01); *G02F 1/133528* (2013.01)

(58) Field of Classification Search
None
See application file for complete search history.

(56) References Cited

U.S. PATENT DOCUMENTS

| 4,720,704 A | * | 1/1988 | Baeger | ...................... G09F 9/35 345/38 |
| 2005/0068482 A1 | * | 3/2005 | Kume | ................... G02F 1/1393 349/156 |

(Continued)

FOREIGN PATENT DOCUMENTS

| CN | 101276116 | 10/2008 |
| CN | 100476530 | 4/2009 |

(Continued)

OTHER PUBLICATIONS

"Office Action of China Counterpart Application", dated Oct. 20, 2022, p. 1-p. 10.

*Primary Examiner* — Phu Vu
(74) *Attorney, Agent, or Firm* — JCIPRNET

(57) ABSTRACT

An electronically-controlled viewing angle switching device, including a liquid crystal layer, a first electrode, a second electrode, a plurality of first insulation patterns, and a plurality of second insulation patterns is provided. The first electrode and the second electrode are respectively located at a first side and a second side of the liquid crystal layer. The first insulation patterns are located at the first side of the liquid crystal layer. The second insulation patterns are located at the second side of the liquid crystal layer. Each of the first insulation patterns is at least partially overlapped with the corresponding second insulation pattern. A display device adopting the electronically-controlled viewing angle switching device is also provided. The electronically-controlled viewing angle switching device and the display device provide a good anti-peed effect from a side viewing angle.

15 Claims, 10 Drawing Sheets

(56) References Cited

U.S. PATENT DOCUMENTS

2018/0052342 A1\* 2/2018 Chang ............... G02F 1/133345
2021/0181551 A1\* 6/2021 Oono .................... G02F 1/1339

FOREIGN PATENT DOCUMENTS

| | | |
|---|---|---|
| CN | 103176316 | 6/2013 |
| CN | 106444185 | 2/2017 |
| CN | 207249281 | 4/2018 |
| CN | 108345139 | 7/2018 |
| CN | 207650518 | 7/2018 |
| CN | 108897151 | 11/2018 |
| TW | 466365 | 12/2001 |
| TW | 201232122 | 8/2012 |
| TW | M500302 | 5/2015 |
| TW | I494607 | 8/2015 |
| TW | I597551 | 9/2017 |

\* cited by examiner

ELECTRONICALLY-CONTROLLED VIEWING ANGLE SWITCHING DEVICE AND DISPLAY DEVICE

CROSS-REFERENCE TO RELATED APPLICATION

This application claims the priority benefit of China application serial no. 201910748129.3, filed on Aug. 14, 2019. The entirety of the above-mentioned patent application is hereby incorporated by reference herein and made a part of this specification.

BACKGROUND

Technical Field

The invention relates to a viewing angle switching device and a display device, and particularly relates to an electronically-controlled viewing angle switching device and a display device.

Description of Related Art

Generally, display device has a wide viewing angle in order to allow multiple viewers to view together. However, in some cases or occasions, such as when browsing private website pages, confidential information or inputting passwords in public, the wide viewing angle display effect is easy to cause the screen to be peeped by others, resulting in the leakage of confidential information. In order to achieve an anti-peep effect, a common practice is to place a Light Control Film (LCF) in front of a display panel to filter out light of a large angle. Conversely, when there is no anti-peep requirement, the LCF is manually removed from the front of the display panel. In other words, although such type of the LCF has the anti-peep effect, operation convenience thereof still has a room for improvement. Therefore, how to develop a display device with very convenient viewing angle switching and good anti-peep effect has become an important issue for relevant manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an electronically-controlled viewing angle switching device with a plurality of transparent regions, and transmittances of the transparent regions have larger differences from a side viewing angle.

The invention is directed to a display device, which has a good anti-peep performance in its side viewing angle.

Other objects and advantages of the invention may be further illustrated by the technical features broadly embodied and described as follows.

In order to achieve one or a portion of or all of the objects or other objects, an embodiment of the invention provides an electronically-controlled viewing angle switching device. The electronically-controlled viewing angle switching device includes a liquid crystal layer, a first electrode, a second electrode, a plurality of first insulation patterns and a plurality of second insulation patterns. The liquid crystal layer has a first side and a second side opposite to each other. The first electrode and the second electrode are respectively located at the first side and the second side of the liquid crystal layer. The first insulation patterns are located at the first side of the liquid crystal layer. The second insulation patterns are located at the second side of the liquid crystal layer. Each of the first insulation patterns is at least partially overlapped with the corresponding second insulation pattern.

In order to achieve one or a portion of or all of the objects or other objects, an embodiment of the invention provides an electronically-controlled viewing angle switching device. The electronically-controlled viewing angle switching device includes a liquid crystal layer, a first electrode, a second electrode, a plurality of first insulation patterns and a plurality of second insulation patterns. The liquid crystal layer has a first side and a second side opposite to each other. The first electrode and the second electrode are respectively located at the first side and the second side of the liquid crystal layer. The first insulation patterns are located at the first side of the liquid crystal layer. The second insulation patterns are located at the first side of the liquid crystal layer. The first insulation patterns and the second insulation patterns are arranged in alternation at the first side of the liquid crystal layer. a dielectric constant of each of the first insulation patterns is not equal to a dielectric constant of each of the second insulation patterns.

In order to achieve one or a portion of or all of the objects or other objects, an embodiment of the invention provides a display device. The display device includes a display panel and an electronically-controlled viewing angle switching device. The electronically-controlled viewing angle switching device is overlapped and disposed on the display panel, and includes a liquid crystal layer, a first electrode, a second electrode, a plurality of first insulation patterns and a plurality of second insulation patterns. The liquid crystal layer has a first side and a second side opposite to each other. The first electrode and the second electrode are respectively located at the first side and the second side of the liquid crystal layer. The first insulation patterns are located at the first side of the liquid crystal layer. The second insulation patterns are located at the second side of the liquid crystal layer. Each of the first insulation patterns is at least partially overlapped with the corresponding second insulation pattern.

Based on the above description, in the electronically-controlled viewing angle switching device and the display device of the embodiments of the invention, by configuring a plurality of insulation patterns to at least one side of the liquid crystal layer, an electric field strength (for example, electric field intensity) distribution corresponding to the insulation patterns or a thickness distribution of the liquid crystal layer may be formed between the two electrodes, so that at least two parts of the liquid crystal layer have different phase retardations. In this way, the electronically-controlled viewing angle switching device may have a plurality of transparent regions corresponding to the insulation patterns, and transmittances of the transparent regions have larger differences from a side viewing angle, so as to form a patterned interference image, which avails improving an anti-peep performance of the display device.

To make the aforementioned more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

Figure 1:
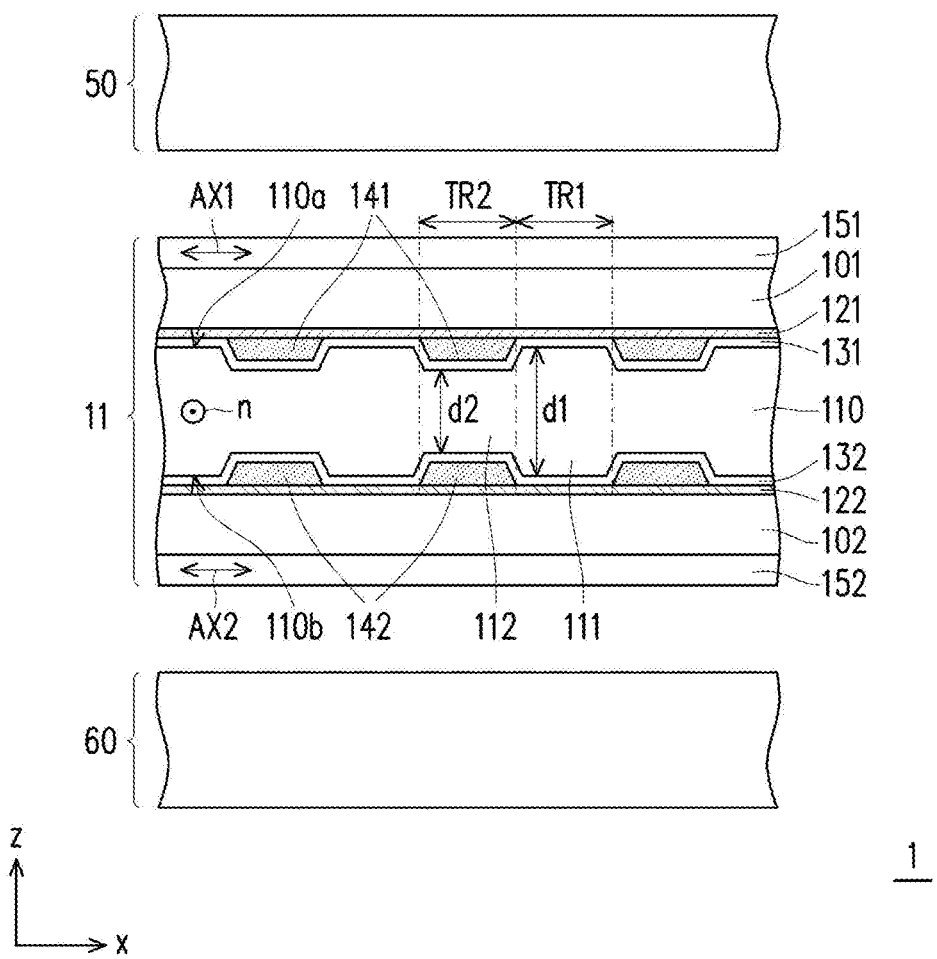
FIG. 1 is a cross-sectional view of a display device according to a first embodiment of the invention.
Figure 2:
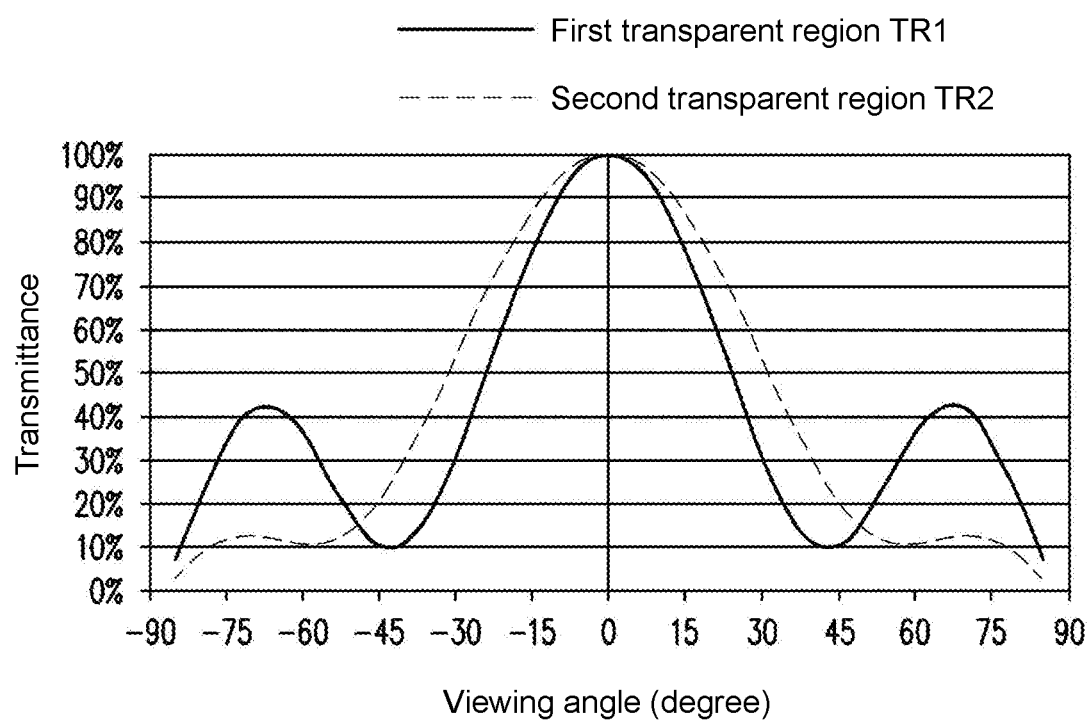
FIG. 2 is a viewing angle-transmittance curve diagram of the electronically-controlled viewing angle switching device of FIG. 1.
Figure 3A:
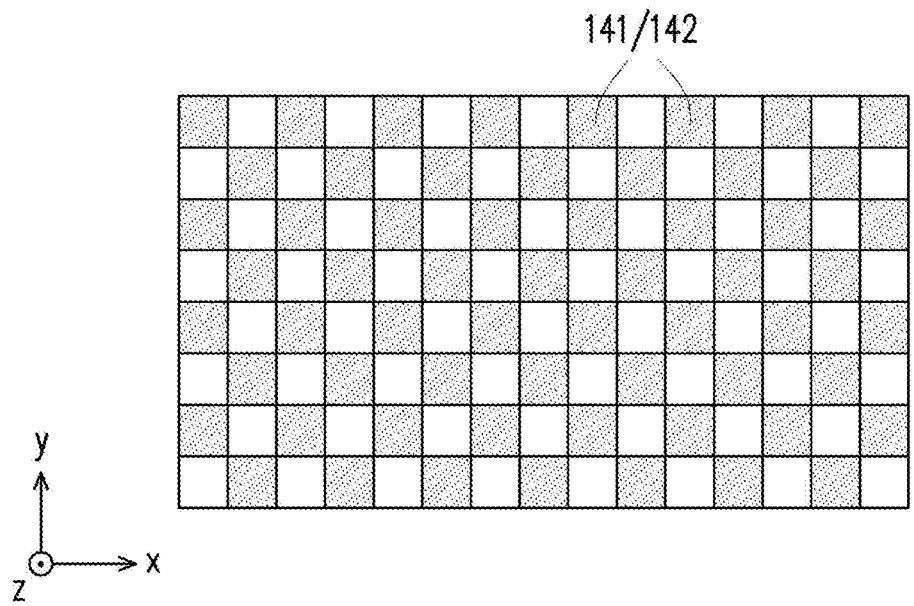
FIG. 3A is a top view of insulation patterns of FIG. 1.
Figure 3B:
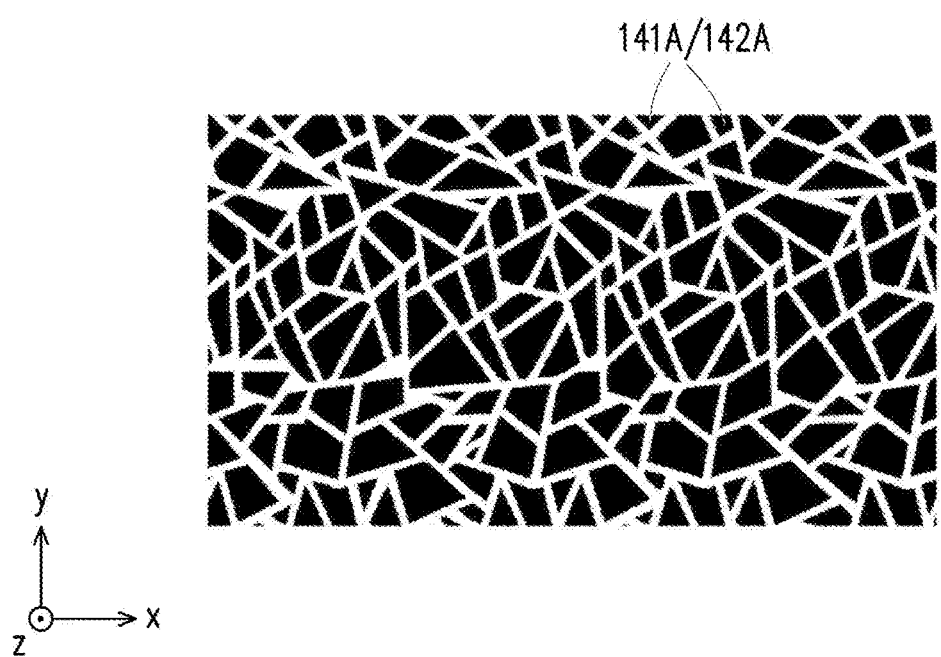
FIG. 3B and FIG. 3C are top views of the insulation patterns according to other embodiments of the invention.
Figure 3C:
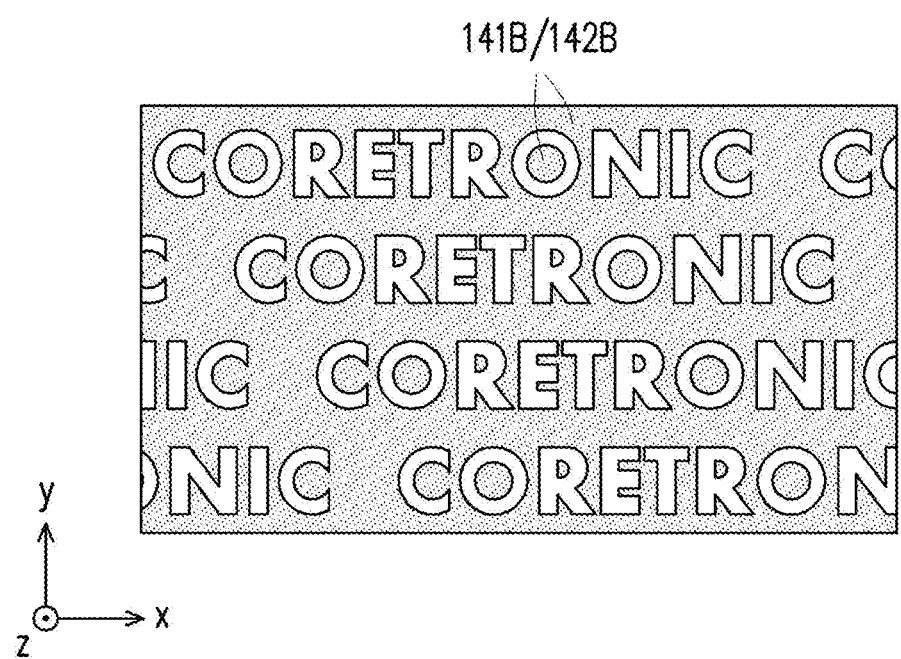
Figure 4A:
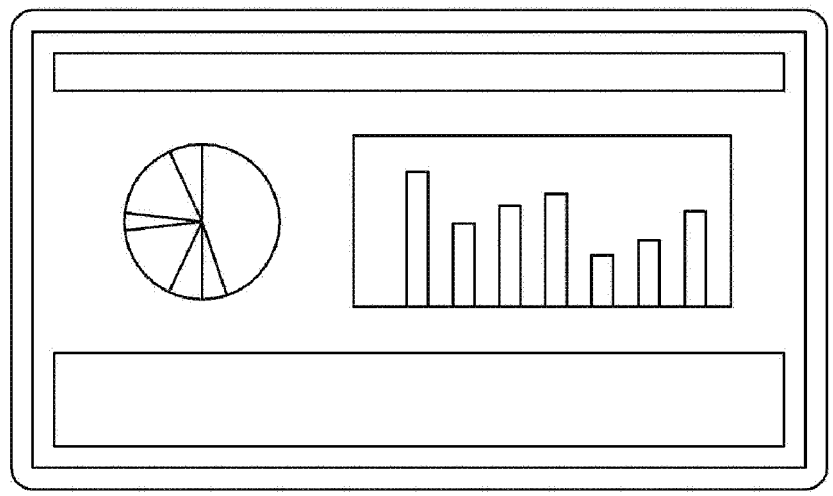
FIG. 4A and FIG. 4B are schematic diagrams of display effects of the display device of FIG. 1 from different viewing angles.
Figure 4B:
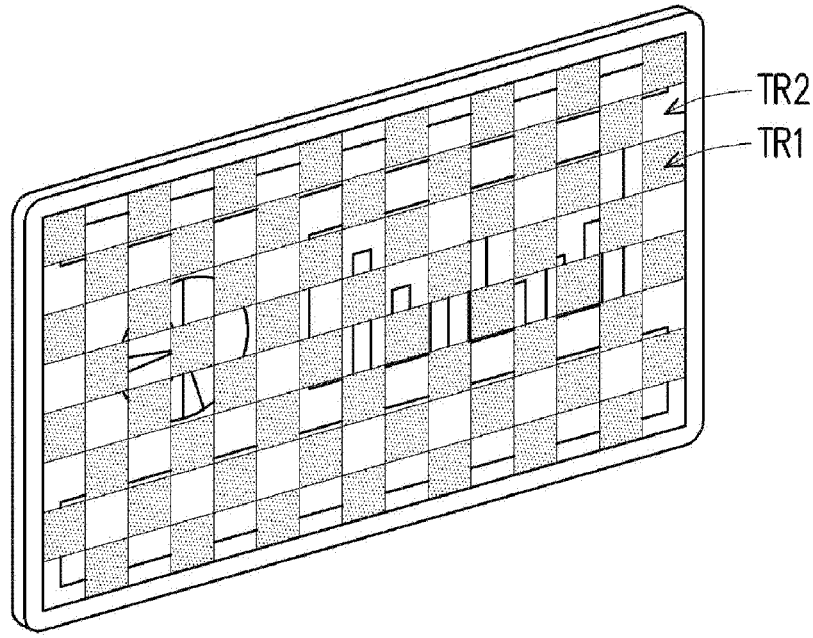

FIG. 1 is a cross-sectional view of a display device according to a first embodiment of the invention. FIG. 2 is a viewing angle-transmittance curve diagram of the electronically-controlled viewing angle switching device of FIG. 1. FIG. 3A is a top view of insulation patterns of FIG. 1. FIG. 3B and FIG. 3C are top views of the insulation patterns according to other embodiments of the invention. FIG. 4A and FIG. 4B are schematic diagrams of display effects of the display device of FIG. 1 from different viewing angles.

Referring to FIG. 1, the display device 1 includes an electronically-controlled viewing angle switching device 11 and a display panel 50, where the electronically-controlled viewing angle switching device 11 may switch the display device between a share mode and an anti-peep mode. In the embodiment, the display panel 50 is, for example, a liquid crystal display panel, or other proper non-self-luminous display panel, and is selectively equipped with a backlight module 60, and the electronically-controlled viewing angle switching device 11 is disposed between the display panel 50 and the backlight module 60. However, the invention is not limited thereto, and in other embodiments, the display panel 50 of the display device 1 may also be an Organic Light Emitting Diode (OLED) panel, a Micro Light Emitting Diode (Micro LED), or other proper self-luminous display panel without being selectively equipped with the backlight module 60, and the electronically-controlled viewing angle switching device 11 is disposed at a light emitting side of the display panel 50.

In detail, the electronically-controlled viewing angle switching device 11 includes a liquid crystal layer 110, a first electrode 121 and a second electrode 122, where the liquid crystal layer 110 includes a first side 110a and a second side 110b opposite to each other, and the first electrode 121 and the second electrode 122 are respectively located at the first side 110a and the second side 110b of the liquid crystal layer 110. In detail, when the first electrode 121 and the second electrode 122 are enabled, there is a potential difference between the two electrodes, which may generate an electric field between the two electrodes to drive a plurality of liquid crystal molecules of the liquid crystal layer 110 to rotate. In other words, optical axis steering of the plurality of liquid crystal molecules may be changed by different magnitudes and distributions of the electric field to adjust amounts (or transmittances) of light emitted by the electronically-controlled viewing angle switching device 11 at different viewing angles, so as to switch the display device 1 between the share mode and the anti-peep mode. In the embodiment, the first electrode 121 and the second electrode 122 are, for example, light transmissive electrodes, and a material of the light transmissive electrodes includes indium tin oxide, indium zinc oxide, aluminum tin oxide, aluminum zinc oxide, or other suitable oxide, a very thin metal, a metal mesh or wire grid, carbon nanotube, Ag nano-wire, graphene or a stacked layer of at least two of the above materials.

Further, the electronically-controlled viewing angle switching device 11 further includes a plurality of first insulation patterns 141 and a plurality of second insulation patterns 142. In the embodiment, the first insulation patterns 141 are disposed at the first side 110a of the liquid crystal layer 110, the second insulation patterns 142 are disposed at the second side 110b of the liquid crystal layer 110, and the first insulation patterns 141 may be completely overlapped with the second insulation patterns 142 in a direction z. But the invention is not limited thereto, and in other embodiments, the first insulation patterns 141 may be at least partially overlapped with the corresponding second insulation patterns 142. In the embodiment, the first insulation patterns 141 (or the second insulation patterns 142) may define a plurality of first transparent regions TR1 and a plurality of second transparent regions TR2 of the electronically-controlled viewing angle switching device 11, where the region of the mutually overlapped the first insulation pattern 141 and the second insulation pattern 142 is defined as the second transparent region TR2, and the first transparent region TR1 is located between two adjacent transparent regions TR2. Particularly, in order to increase a difference of the transmittances of the first transparent region TR1 and the second transparent region TR2, a thickness summation of the first insulation pattern 141 and the second insulation pattern 142 is relatively large, so that in the invention, the first insulation patterns 141 and the second insulation patterns 142 are configured to avoid a difficulty in manufacturing the insulation layer with a larger thickness, and avoid a damage of an alignment film or the electrode layer caused by a process surface mismatch, and reduce a side effect caused by a vertical surface of the insulation pattern layer.

In the embodiment, respective outer contours of the first insulation patterns 141 (or the second insulation patterns 142) of the electronically-controlled viewing angle switching device 11 are, for example, squares (shown in FIG. 3A), and the first insulation patterns 141 (or the second insulation patterns 142) are respectively arranged in a plurality of rows and columns in an x direction and a y direction (shown in FIG. 3A). To be specific, the insulation patterns (for example, the first insulation patterns 141 or the second insulation patterns 142) are arranged on a substrate (for example, first substrate 101, as shown in FIG. 1) in a checkerboard pattern. However, the invention is not limited thereto, and in another embodiment, the respective outer contours of the first insulation patterns 141A (or the second insulation patterns 142A) may be different shapes (for example, trapezoidal, triangular, pentagonal, or arbitrary polygons), and the first insulation patterns 141A are arranged in an irregular manner (as shown in FIG. 3B). In another embodiment, the first insulation patterns 141B (or the second insulation patterns 142B) may also be an insulation pattern layer with a font outline (as shown in FIG. 3C) or an insulation pattern layer with hollowed-out characters.

According to another aspect, in the embodiment, the liquid crystal layer 110 may include a plurality of first portions 111 and a plurality of second portions 112 arranged in alternation in the x direction (or in the y direction), where the first portions 111 and the second portions 112 are respectively located in the first transparent regions TR1 and the second transparent regions TR2. In other words, the first portions 111 of the liquid crystal layer 110 are not overlapped with the first insulation patterns 141 and the second insulation patterns 142 in the direction z, and the second portions 112 are overlapped with the first insulation patterns 141 and the second insulation patterns 142 in the direction z. Therefore, a thickness d1 of the first portion 111 of the liquid crystal layer 111 in the direction z may be greater than a thickness d2 of the second portion 112 in the direction z. Namely, the maximum phase retardation generated by the first portions 111 of the liquid crystal layer 110 is greater than the maximum phase retardation generated by the second portions 112. In the embodiment, the thickness d1 of the first portion 111 of the liquid crystal layer 110 may be between 1 μm and 20 μm, and the thickness d2 of the second portion 112 may be between 0 μm and 19 μm. In a preferred embodiment, a difference between the thickness d1 of the first portion 111 and the thickness d2 of the second portion 112 of the liquid crystal layer 110 may be between 0.1 μm and 19 μm.

Particularly, since the second transparent regions TR2 are configured with the first insulation patterns 141 and the second insulation patterns 142. When the first electrode 121 and the second electrode 122 are enabled to have a specific voltage (for example, apply the specific voltage to the first electrode 121 or the second electrode 122), the first portion 111 and the second portion 112 of the liquid crystal layer 110 are affected by the electric field to a different extent. Namely, under a same driving voltage, a phase retardation generated by the first portion 111 of the liquid crystal layer 110 is different to a phase retardation generated by the second portion 112.

On the other hand, the electronically-controlled viewing angle switching device 11 further includes a first substrate 101, a second substrate 102, a first alignment film 131 and a second alignment film 132, where the first alignment film 131 and the second alignment film 132 are disposed between the first substrate 101 and the second substrate 102, and the liquid crystal layer 110 is clamped between the first alignment film 131 and the second alignment film 132. To be specific, the first alignment film 131 is disposed on the first substrate 101 and located at the first side 110a of the liquid crystal layer 110, the first electrode 121 is located between the first alignment film 131 and the first substrate 101, and the first insulation patterns 141 are disposed at the first side 110a of the liquid crystal layer 110 and located between the first alignment film 131 and the first electrode 121; the second alignment film 132 is disposed on the second substrate 102 and located at the second side 110b of the liquid crystal layer 110, the second electrode 122 is located between the second alignment film 132 and the second substrate 102, and the second insulation patterns 142 are disposed at the second side 110b of the liquid crystal layer 110 and located between the second alignment film 132 and the second electrode 122. Particularly, the alignment film is used for arranging a plurality of liquid crystal molecules (not shown) of the liquid crystal layer 110 such that optical axes n thereof are oriented to a predetermined direction, and the first substrate 101 and the second substrate 102 are, for example, transparent glass substrates or transparent flexible substrates, and a material thereof is, for example, glass, quartz or organic polymer, etc. In the embodiment, the plurality of liquid crystal molecules of the liquid crystal layer 110 are positive liquid crystal molecules, and the first alignment film 131 and the second alignment film 132 are horizontal alignment films, but the invention is not limited thereto.

It should be noted that since the second transparent region TR2 is configured with the first insulation pattern 141 and the second insulation pattern 142, a space between the first alignment film 131 and the second alignment film 132 in the first transparent region TR1 is greater than a space between the first alignment film 131 and the second alignment film 132 in the second transparent region TR2. When the first electrode 121 and the second electrode 122 are enabled to have a specific voltage, the first portions 111 of the liquid crystal layer 110 are easier to be driven by the formed electric field compared with the second portions 112. Namely, under the same driving voltage, the phase retardation generated by the first portion 111 of the liquid crystal layer 110 is greater than the phase retardation generated by the second portion 112, which avails enlarging the difference between the phase retardations generated by the first portion 111 and the second portion 112 of the liquid crystal layer 110.

Further, the electronically-controlled viewing angle switching device 11 further includes a first polarizer 151 and a second polarizer 152 respectively disposed at the first side 110a and the second side 110b of the liquid crystal layer 110. To be specific, the first polarizer 151 is located at one side of the first substrate 101 away from the liquid crystal layer 110, and the second polarizer 152 is located at one side of the second substrate 102 away from the liquid crystal layer 110. For example, an axial direction of an absorption axis AX1 of the first polarizer 151 may be parallel to an axial direction of an absorption axis AX2 of the second polarizer 152, and an axial direction of the optical axis n of the liquid crystal layer 110 may be substantially perpendicular to the absorption axes of the two polarizers. However, the invention is not limited thereto, and in other embodiments, an included angle between the axial direction of the optical axis n of the liquid crystal layer 110 and the axial direction of the absorption axis of the polarizer may be between 70 degrees and 110 degrees. In another embodiment, the axial direction of the optical axis n of the liquid crystal layer 110 may be substantially parallel with the absorption axes of the two polarizers or the included angle may be between −20 degrees and 20 degrees. Particularly, the direction (i.e. a direction x) perpendicular to the axial direction of the optical axis n of the liquid crystal layer 110 may be defined as a viewing angle control direction of the electronically-controlled viewing angle switching device 11 (i.e., in the direction x, light output amounts or transmittances from different viewing angles may be controlled), and the viewing angle (for example, a viewing angle range shown in FIG. 2) in the following descriptions are all defined to the viewing angle control direction.

It should be noted that when the anti-peep mode of the display device 1 is activated (i.e., the electronically-controlled viewing angle switching device 11 is enabled), since the optical axis n of the liquid crystal layer 110 is substantially perpendicular to the axial directions of the absorption axes of the two polarizers, the first portions 111 and the second portions 112 of the liquid crystal layer 110 do not generate substantial phase retardation to a light beam coming from the backlight module 60 and vertically incident to the second substrate 102, i.e., do not change a polarization direction of the light beam. Therefore, the light beam coming from the second polarizer 152 may maintain its original polarization state and pass through the first polarizer 151 after passing through the liquid crystal layer 110. Namely, from a front viewing angle (i.e., a viewing angle of 0 degree), the transmittance of the first transparent region TR1 configured with the first portion 111 is substantially the same with the transmittance of the second transparent region TR2 configured with the second portion 112, and the transmittances of the two transparent regions at the front viewing angle are the maximum transmittances within a viewing angle range, as shown in FIG. 2. For example, since the first transparent region TR1 and the second transparent region TR2 substantially have the same maximum transmittance from the front viewing angle, the light beam coming from the backlight module 60 does not form an interference image (for example, the checkerboard pattern, formed by the first insulation patterns 141) after passing through the electronically-controlled viewing angle switching device 11. Therefore, the image of the display panel 50 (for example, a statistical report or confidential data) may be normally displayed to a front view user, as shown in FIG. 4A.

On the other hand, the first portions 111 and the second portions 112 of the liquid crystal layer 110 may generate substantial phase retardation to the light beam that is not vertically incident to the second substrate 102, i.e., to change a polarization direction of the light beam, and the phase retardation generated by the first portions 111 is greater than the phase retardation generated by the second portions 112. Namely, from the side viewing angle, the transmittance of the first transparent regions TR1 configured with the first portions 111 is not equal to the transmittance of the second transparent regions 111 configured with the second portions 112, and the transmittance of each of the first transparent regions TR1 configured with the first portions 111 are substantially the same, as shown in FIG. 2. For example, from a viewing angle of 43 degrees, the transmittance of the second transparent regions TR2 is obviously greater than the transmittance of the first transparent regions TR1, and the transmittance of the first transparent regions TR1 at the viewing angle of 43 degrees is the minimum transmittance within a viewing angle range of ±60 degrees. If the display device 1 is viewed in the viewing angle of 43 degrees, the first transparent regions TR1 become dark regions due to the minimum transmittance, and the second transparent regions TR2 become bright regions due to a larger transmittance. Namely, the electronically-controlled viewing angle switching device 11 may present a checkerboard interference image (for example, formed by the first insulation patterns 141) at the viewing angle of 43 degrees, and the interference image is overlapped with a displayed image of the display panel 50, as shown in FIG. 4B. In this way, readability of the displayed image of the display panel 50 from the side viewing angle is effectively reduced, so as to achieve the anti-peep effect.

Similarly, from a viewing angle of 58 degrees, the transmittance of the first transparent regions TR1 is obviously greater than the transmittance of the second transparent regions TR2, and the transmittance of the second transparent regions TR2 at the viewing angle of 58 degrees is the minimum transmittance within the viewing angle range of ±60 degrees. If the display device 1 is viewed in the viewing angle of 58 degrees, the second transparent regions TR2 become dark regions due to the minimum transmittance, and the first transparent regions TR1 become bright regions due to a larger transmittance. Namely, the electronically-controlled viewing angle switching device 11 may present an interference image (for example, the checkerboard) at the viewing angle of 58 degrees, and a distribution of the bright and dark regions is opposite to that of the interference image presented from the viewing angle of 43 degrees. Therefore, readability of the displayed image of the display panel 50 from a large viewing angle may still be effectively reduced, so as to achieve the anti-peep effect.

It should be noted that the number and distribution density of the first transparent regions TR1 and the second transparent regions TR2 shown in FIG. 4B are for illustrative purposes only, and the invention is not limited to the content disclosed in the drawings. In other embodiments, the number and distribution density of the first transparent regions TR1 and the second transparent regions TR2 may also be adjusted according to an actual anti-peed requirement.

Electronically-controlled viewing angle switching device of other embodiments are provided below to describe the invention in detail, where the same reference numbers denote the same or like components, and descriptions of the same technical contents are omitted. The aforementioned embodiment may be referred for descriptions of the omitted parts, and detailed descriptions thereof are not repeated in the following embodiment. Particularly, the electronically-controlled viewing angle switching devices of the following embodiments may also be applied to the display device 1 of the aforementioned embodiment.

Figure 5:
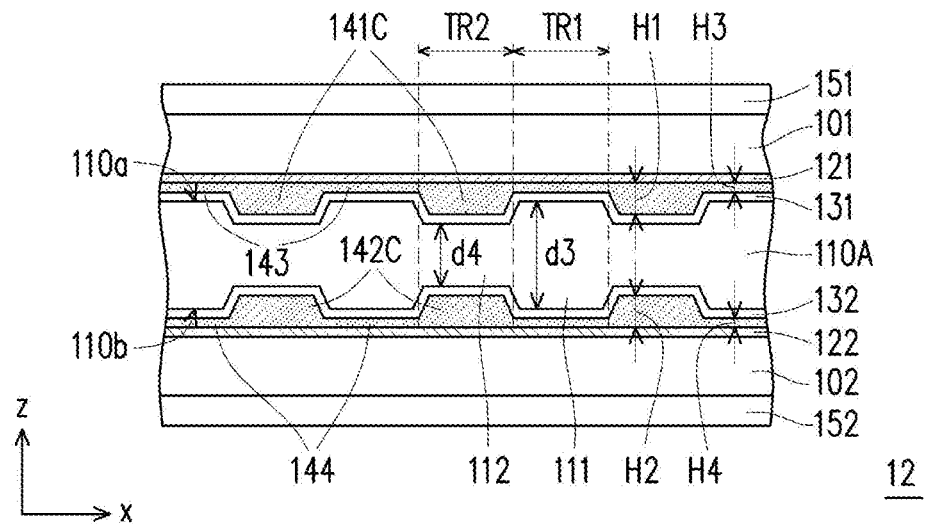
FIG. 5 is a cross-sectional view of an electronically-controlled viewing angle switching device according to a second embodiment of the invention.

FIG. 5 is a cross-sectional view of an electronically-controlled viewing angle switching device according to a second embodiment of the invention. Referring to FIG. 5, a difference between the electronically-controlled viewing angle switching device 12 of the embodiment and the electronically-controlled viewing angle switching device 11 of FIG. 1 is that the electronically-controlled viewing angle switching device 12 further includes a plurality of third insulation patterns 143 and a plurality of fourth insulation patterns 144, and the third insulation patterns 143 are completely overlapped with the fourth insulation patterns 144 in the direction z. The third insulation patterns 143 are disposed at the first side 110a of the liquid crystal layer 110 and located between the first alignment film 131 and the first electrode 121, and the fourth insulation patterns 144 are disposed at the second side 110b of the liquid crystal layer 110 and located between the second alignment film 132 and the second electrode 122. The first insulation patterns 141C and the second insulation patterns 142C are similar to the first insulation patterns 141 and the second insulation patterns 142, and the difference there between lies in the thickness. In the embodiment, the first insulation patterns 141C, the second insulation patterns 142C, the third insulation patterns 143 and the fourth insulation patterns 144 respectively have a thickness H1, a thickness H2, a thickness H3 and a thickness H4 in the direction z, and the thickness H1 of the first insulation pattern 141C may be greater than the thickness H3 of the third insulation pattern 143, and the thickness H2 of the second insulation pattern 142C may be greater than the thickness H4 of the fourth insulation pattern 144. In another embodiment, the electronically-controlled viewing angle switching device 12 may also not include the fourth insulation patterns 144.

On the other hand, the plurality of first insulation patterns 141C and the plurality of third insulation patterns 143 are arranged at the first side 110a of the liquid crystal layer 110A in alternation in the direction x, and the plurality of second insulation patterns 142C and the plurality of fourth insulation patterns 144 are arranged at the second side 110b of the liquid crystal layer 110A in alternation in the direction x. For example, the first insulation patterns 141C and the third insulation patterns 143 may be a same film layer, and the second insulation patterns 142C and the fourth insulation patterns 144 may be a same film layer. Namely, the first insulation patterns 141C and the third insulation patterns 143 (or the second insulation patterns 142C and the fourth insulation patterns 144) may define an uneven structure of an insulation layer, but the invention is not limited thereto.

Further, the third insulation patterns 143 (or the fourth insulation patterns 144) and the first insulation patterns 141C (or the second insulation patterns 142C) may respectively define the first transparent regions TR1 and the second transparent regions TR2 of the electronically-controlled viewing angle switching device 12. In the embodiment, the first portions 111 of the liquid crystal layer 110A located at the first transparent regions TR1 have a thickness d3 in the direction z, the second portions 112 of the liquid crystal layer 110A located at the second transparent regions TR2 have a thickness d4 in the direction z, and the thickness d3 of the first portions 111 is greater than the thickness d4 of the second portions 112. In other words, the maximum phase retardation generated by the first portions 111 of the liquid crystal layer 110A may be greater than the maximum phase retardation generated by the second portions 112. In this way, from the side viewing angle, a light output amount (or transmittance) of the first transparent regions TR1 of the electronically-controlled viewing angle switching device 12 may be obviously different to a light output amount (or transmittance) of the second transparent regions TR2, so as to form the patterned interference image.

Figure 6:
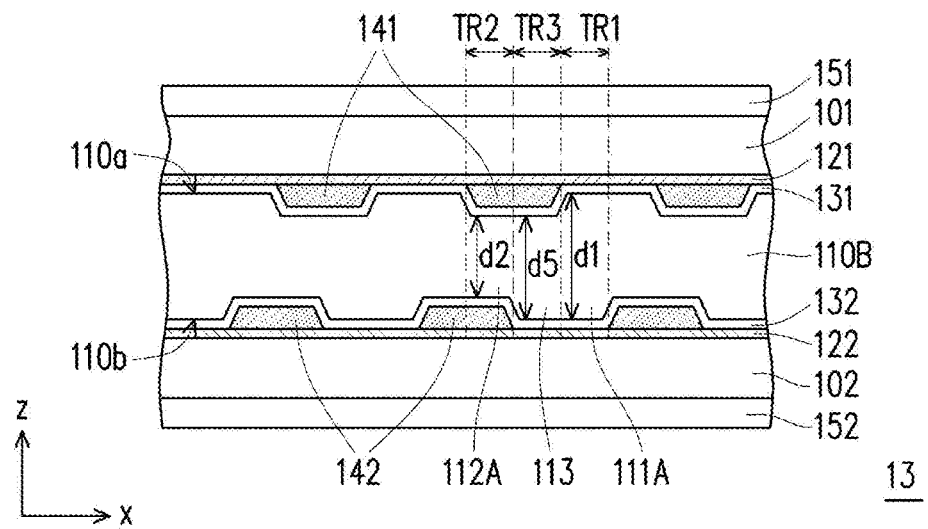
FIG. 6 is a cross-sectional view of an electronically-controlled viewing angle switching device according to a third embodiment of the invention.

FIG. 6 is a cross-sectional view of an electronically-controlled viewing angle switching device according to a third embodiment of the invention. Referring to FIG. 6, a difference between the electronically-controlled viewing angle switching device 13 of the embodiment and the electronically-controlled viewing angle switching device 11 of FIG. 1 lies in a relative configuration relationship of the first insulation patterns 141 and the second insulation patterns 142 and an accordingly produced thickness difference of the liquid crystal layer 110. In the embodiment, the first insulation patterns 141 may be partially overlapped with the second insulation patterns 142 in the direction z (i.e., the first insulation patterns 141 may be misaligned with the second insulation patterns 142). The first insulation patterns 141 and the second insulation patterns 142 may define the first transparent regions TR1, the second transparent regions TR2 and a third transparent regions TR3 of the electronically-controlled viewing angle switching device 13, and the third transparent regions TR3 are located between the first transparent regions TR1 and the second transparent regions TR2.

Further, the first portions 111A of the liquid crystal layer 110B located at the first transparent regions TR1 have a thickness d1 in the direction z, the second portions 112A of the liquid crystal layer 110B located at the second transparent regions TR2 have a thickness d2 in the direction z, and the third portions 113 of the liquid crystal layer 110B located at the third transparent regions TR3 have a thickness d5 in the direction z, and the thickness d1 of the first portions 111A is greater than the thickness d5 of the third portions 113, and the thickness d2 of the second portions 112A is smaller than the thickness d5 of the third portions 113. In other words, the maximum phase retardation generated by the first portions 111A of the liquid crystal layer 110B is greater than the maximum phase retardation generated by the third portions 113, and the maximum phase retardation generated by the second portions 112A is less than the maximum phase retardation generated by the third portions 113. In this way, from the side viewing angle, the respective transmittances (or light output amounts) of the first transparent regions TR1, the second transparent regions TR2 and the third transparent regions TR3 of the electronically-controlled viewing angle switching device 13 may be obviously different from each other, so as to form the patterned interference image.

Figure 7:
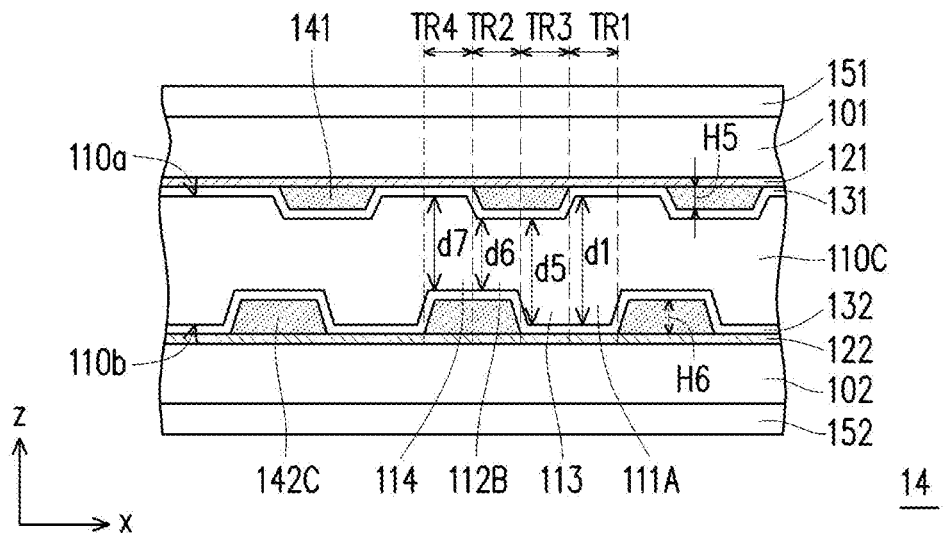
FIG. 7 is a cross-sectional view of an electronically-controlled viewing angle switching device according to a fourth embodiment of the invention.

FIG. 7 is a cross-sectional view of an electronically-controlled viewing angle switching device according to a fourth embodiment of the invention. Referring to FIG. 7, a main difference between the electronically-controlled viewing angle switching device 14 of the embodiment and the electronically-controlled viewing angle switching device 13 of FIG. 6 is that the thickness of the first insulation pattern is different to the thickness of the second insulation pattern. In the embodiment, the first insulation pattern 141 and the second insulation pattern 142C respectively have a thickness H5 and a thickness H6, and the thickness H6 of the second insulation pattern 142C may be selectively greater than the thickness H5 of the first insulation pattern 141, but the invention is not limited thereto. The first insulation patterns 141 and the second insulation patterns 142C may define the first transparent regions TR1, the second transparent regions TR2, the third transparent regions TR3 and a fourth transparent regions TR4, and the third transparent regions TR3 are located between the first transparent regions TR1 and the second transparent regions TR2, and the second transparent regions TR2 are located between the third transparent regions TR3 and the fourth transparent regions TR4.

Further, the first portions 111A of the liquid crystal layer 110C located at the first transparent regions TR1 have a thickness d1 in the direction z, the second portions 112B of the liquid crystal layer 110C located at the second transparent regions TR2 have a thickness d6 in the direction z, the third portions 113 of the liquid crystal layer 110C located at the third transparent regions TR3 have a thickness d5 in the direction z, and fourth portions 114 of the liquid crystal layer 110C located at the fourth transparent regions TR4 have a thickness d7 in the direction z, and the thickness d1 of the first portions 111A is greater than the thickness d5 of the third portions 113, the thickness d5 of the third portions 113 is greater than the thickness d7 of the fourth portions 114, and the thickness d6 of the second portions 112A is smaller than the thickness d7 of the fourth portions 114. In other words, the maximum phase retardation generated by the first portions 111A of the liquid crystal layer 110C is greater than the maximum phase retardation generated by the third portions 113, the maximum phase retardation generated by the third portions 113 is greater than the maximum phase retardation generated by the fourth portions 114, and the maximum phase retardation generated by the second portions 112B is less than the maximum phase retardation generated by the fourth portions 114. In this way, from the side viewing angle, the respective transmittances (or light output amounts) of the first transparent regions TR1, the second transparent regions TR2, the third transparent regions TR3 and the fourth transparent regions TR4 of the electronically-controlled viewing angle switching device 14 may be obviously different from each other, so as to form the patterned interference image.

Figure 8:
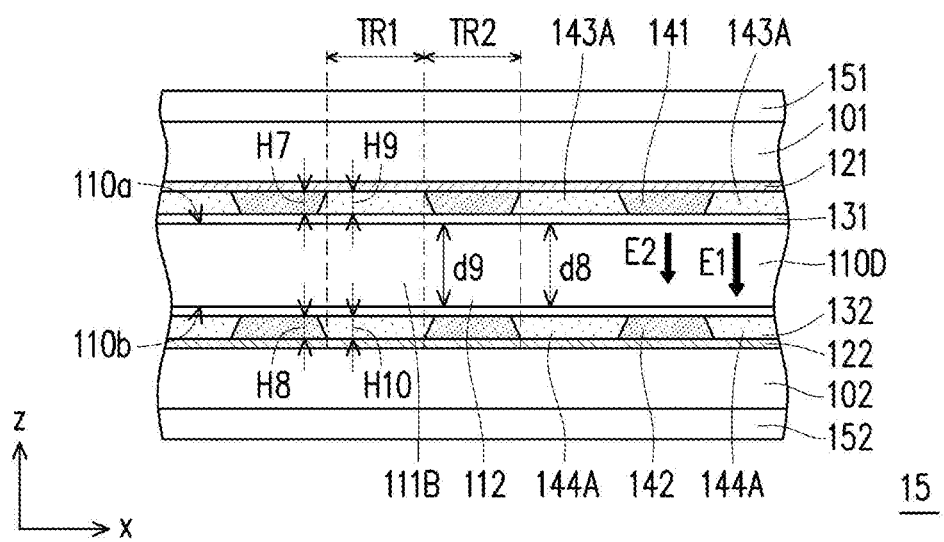
FIG. 8 is a cross-sectional view of an electronically-controlled viewing angle switching device according to a fifth embodiment of the invention.

FIG. 8 is a cross-sectional view of an electronically-controlled viewing angle switching device according to a fifth embodiment of the invention. Referring to FIG. 8, a main difference between the electronically-controlled viewing angle switching device 15 of the embodiment and the electronically-controlled viewing angle switching device 11 of FIG. 1 is that the electronically-controlled viewing angle switching device 15 further includes a plurality of third insulation patterns 143A and a plurality of fourth insulation patterns 144A, and a dielectric constant of the third insulation patterns 143A and the fourth insulation patterns 144A is different to a dielectric constant of the first insulation patterns 141 and the second insulation patterns 142. In another embodiment, the electronically-controlled viewing angle switching device 15 may also not include the fourth insulation patterns 144A.

For example, the dielectric constant of the first insulation patterns 141 may be greater than the dielectric constant of the third insulation patterns 143A, and the dielectric constant of the second insulation patterns 142 may be greater than the dielectric constant of the fourth insulation patterns 144A. The dielectric constant of the first insulation patterns 141 and the second insulation patterns 142 may be within a range between 3 and 80. Namely, a material of the first insulation patterns 141 and the second insulation patterns 142 may be a material with a higher dielectric constant. In the embodiment, the material of the first insulation patterns 141 and the second insulation patterns 142 may include $Si_3N_4$, $Al_2O_3$, $Y_2O_3$, $TiO_2$, $HfO_2$, $ZrO_2$, or other proper high dielectric constant material. In the embodiment, a thickness H7 of the first insulation pattern 141 may be equal to a thickness H9 of the third insulation pattern 143A, and a thickness H8 of the second insulation pattern 142 may be equal to a thickness H10 of the fourth insulation pattern 144A, but the invention is not limited thereto. According to other embodiments, the thickness of the first insulation pattern may also be greater than the thickness of the third insulation pattern, and the thickness of the second insulation pattern may also be greater than the thickness of the fourth insulation pattern.

On the other hand, the plurality of first insulation patterns 141 and the plurality of third insulation patterns 143A are arranged at the first side 110a of the liquid crystal layer 110D in alternation in the direction x, and the plurality of second insulation patterns 142 and the plurality of fourth insulation patterns 144A are arranged at the second side 110b of the liquid crystal layer 110D in alternation in the direction x. The third insulation patterns 143A (or the fourth insulation patterns 144A) and the first insulation patterns 141 (or the second insulation patterns 142) may respectively define the first transparent regions TR1 and the second transparent regions TR2 of the electronically-controlled viewing angle switching device 15. In the embodiment, the first portions 111B of the liquid crystal layer 110D located at the first transparent regions TR1 have a thickness d8 in the direction z, the second portions 112 of the liquid crystal layer 110D located at the second transparent regions TR2 have a thickness d9 in the direction z, and the thickness d8 of the first portions 111B may be substantially equal to the thickness d9 of the second portions 112. Namely, the liquid crystal layer 110D only has a single thickness.

It should be noted that in the embodiment, when the first electrode 121 and the second electrode 122 are enabled to have a specific voltage, since the insulation patterns in the first transparent regions TR1 and the second transparent regions TR2 have different dielectric constants, a strength of an electric field E2 formed between the mutually overlapped first insulation pattern 141 and the second insulation pattern 142 may be less than a strength of an electric field E1 formed between the mutually overlapped third insulation pattern 143A and the fourth insulation pattern 144A. Namely, when the electronically-controlled viewing angle switching device 15 is enabled, an electric field strength distribution corresponding to the plurality of first insulation patterns 141 and the plurality of third insulation patterns 143A (or the second insulation patterns 142 and the fourth insulation patterns 144A) may be formed between the two electrodes.

Further, a strength difference of the electric fields formed by the two electrodes at the first transparent region TR1 and the second transparent region TR2 results in different rotation extent of the liquid crystal molecules (for example, different arrangement of the liquid crystal molecules) in the first portions 111B and the second portions 112 of the liquid crystal layer 110D at the two transparent regions, so that the phase retardation generated by the first portions 111B of the liquid crystal layer 110D is different to the phase retardation generated by the second portions 112. Therefore, the respective transmittances (or light output amounts) of the first transparent regions TR1 and the second transparent regions TR2 of the electronically-controlled viewing angle switching device 15 may be obviously different from the side viewing angle. For example, the first transparent regions TR1 and the second transparent regions TR2 may be respectively dark regions and bright regions, and the plurality of first transparent regions TR1 and the plurality of second transparent regions TR2 of the electronically-controlled viewing angle switching device 15 may present the patterned interference image, so as to reduce the readability of the displayed image of the display panel (as shown in FIG. 1) from the side viewing angle to achieve the anti-peep effect.

Figure 9:
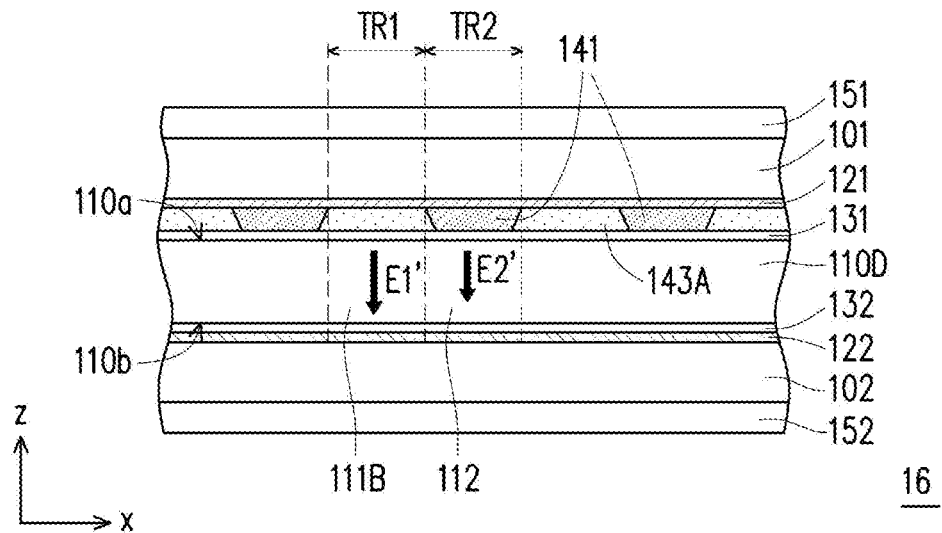
FIG. 9 is a cross-sectional view of an electronically-controlled viewing angle switching device according to a sixth embodiment of the invention.

FIG. 9 is a cross-sectional view of an electronically-controlled viewing angle switching device according to a sixth embodiment of the invention. Referring to FIG. 9, a main difference between the electronically-controlled viewing angle switching device 16 of the embodiment and the electronically-controlled viewing angle switching device 15 of FIG. 8 is that the second side 110b of the liquid crystal layer 110D of the electronically-controlled viewing angle switching device 16 is not configured with insulation patterns (for example, the second insulation patterns 142 and the fourth insulation patterns 144A of FIG. 8). Namely, only the first side 110a of the liquid crystal layer 110D of the electronically-controlled viewing angle switching device 16 is configured with the insulation patterns. In the embodiment, a thickness of the first insulation patterns 141 may be equal to a thickness of the third insulation patterns 143A, and when the first electrode 121 and the second electrode 122 are enabled, only through the first insulation patterns 141 and the third insulation patterns 143A disposed at one side of the liquid crystal layer 110D, the electric fields generated by the two electrodes in the first transparent regions TR1 and the second transparent regions TR2 may have an obvious strength difference. For example, the two electrodes respectively generate an electric field E1' and an electric field E2' at the first transparent regions TR1 and the second transparent regions TR2, and a strength of the electric field E1' may be greater than a strength of the electric field E2'. In other words, by increasing a difference between the dielectric constants of the first insulation pattern 141 and the third insulation pattern 143A, a configuration amount of the insulation pattern layers may be reduced, which avails simplifying a manufacturing process.

Figure 10:
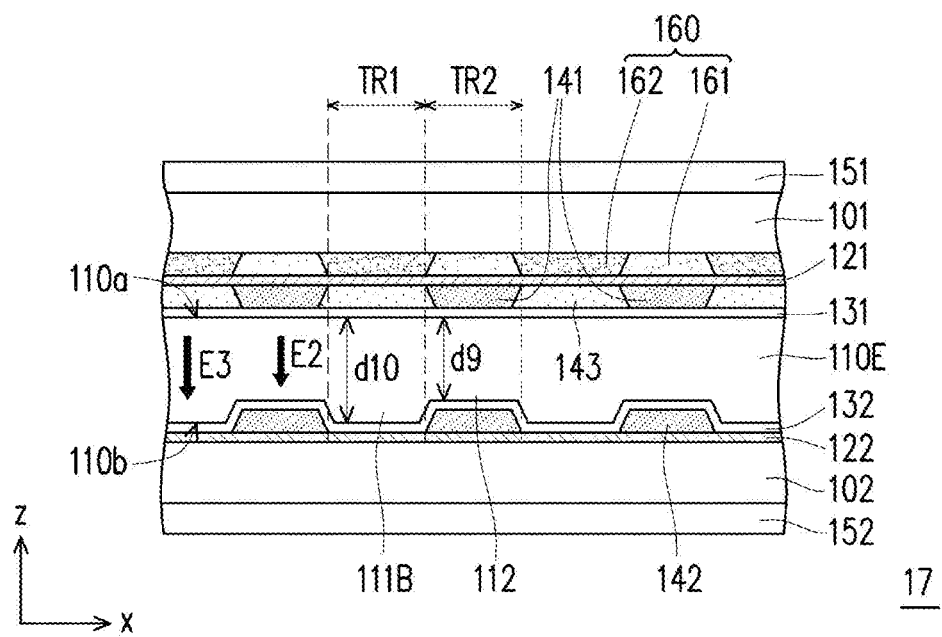
FIG. 10 is a cross-sectional view of an electronically-controlled viewing angle switching device according to a seventh embodiment of the invention.

FIG. 10 is a cross-sectional view of an electronically-controlled viewing angle switching device according to a seventh embodiment of the invention. Referring to FIG. 10, a main difference between the electronically-controlled viewing angle switching device 17 of the embodiment and the electronically-controlled viewing angle switching device 15 of FIG. 8 is that the electronically-controlled viewing angle switching device 17 does not have the fourth insulation patterns 144A shown in FIG. 8, and selectively includes a refractive index matching layer 160. In the embodiment, since the first transparent regions TR1 are not configured with the fourth insulation patterns 144A shown in FIG. 8, a thickness d10 of the first portions 111B of the liquid crystal layer 110E may be greater than a thickness d9 of the second portions 112, and a difference between an electric field E3 formed by the first electrode 121 and the second electrode 122 at the first transparent regions TR1 and an electric field E2 formed at the second transparent regions TR2 may be further enlarged. Namely, in the embodiment, by forming the electric field strength distribution corresponding to the insulation patterns and a thickness distribution of the liquid crystal layer 110E between the two electrodes, the phase retardation of the first portions 111B of the liquid crystal layer 110E in the side viewing angle is different to the phase retardation of the second portions 112 in the side viewing angle.

Particularly, in the embodiment, a material of the first insulation pattern 141 may be a material with a high dielectric constant, so that a thickness summation of the thickness of the first insulation patterns 141 and the thickness of the second insulation patterns 142 may have a smaller thickness summation value, but is still maintained to be greater than the thickness of the third insulation patterns 143. For example, the thickness of the second insulation patterns 142 may be smaller than 5 μm or equal to 0 (i.e., the electronically-controlled viewing angle switching device 17 does not have the second insulation patterns 142), such that the thickness summation value is all contributed by the first insulation patterns 141, and along with the use of the high dielectric constant material, the effect of obvious difference in the respective transmittances (or the light output amounts) of the first transparent regions TR1 and the second transparent regions TR2 may also be achieved.

On the other hand, in order to make a boundary of the plurality of first insulation patterns 141 and the plurality of third insulation patterns 143 not easily observed from the front viewing angle, the electronically-controlled viewing angle switching device 17 may further include the refractive index matching layer 160. In the embodiment, the refractive index matching layer 160 is disposed at the first side 110a of the liquid crystal layer 110E, and is located at one side of the first electrode 121 away from the liquid crystal layer 110E, but the invention is not limited thereto. In other embodiments, the refractive index matching layer 160 may also be disposed between the first substrate 101 and the first polarizer 151 (or between the second substrate 102 and the second electrode 122), between the insulation patterns (the first insulation patterns 141, the third insulation patterns 143) on the first substrate 101 and the first electrode 121, or between the insulation patterns (the first insulation patterns 141, the third insulation patterns 143) on the first substrate 101 and the first alignment film 131. For example, the refractive index matching layer 160 includes a plurality of first matching portions 161 and a plurality of second matching portions 162. The first matching portions 161 and the second matching portions 162 are respectively overlapped with (for example, completely overlapped) the first insulation patterns 141 and the third insulation patterns 143 in the direction z. In another embodiment, the refractive index matching layer 160 may also be a non-patterned design, and is disposed between the first insulation patterns 141 and the first electrode 121.

Further, a refractive index of the first insulation patterns 141 is greater than a refractive index of the third insulation patterns 143, and a refractive index of the first matching portions 161 is less than a refractive index of the second matching portions 162. Namely, by compensating a refractive index difference of the first insulation pattern 141 and the third insulation pattern 143 through a refractive index difference of the two matching portions of the refractive index matching layer 160, visibility of the insulation pattern layer from the front viewing angle may be reduced, which avails improving a visual taste of the display device.

Figure 11:
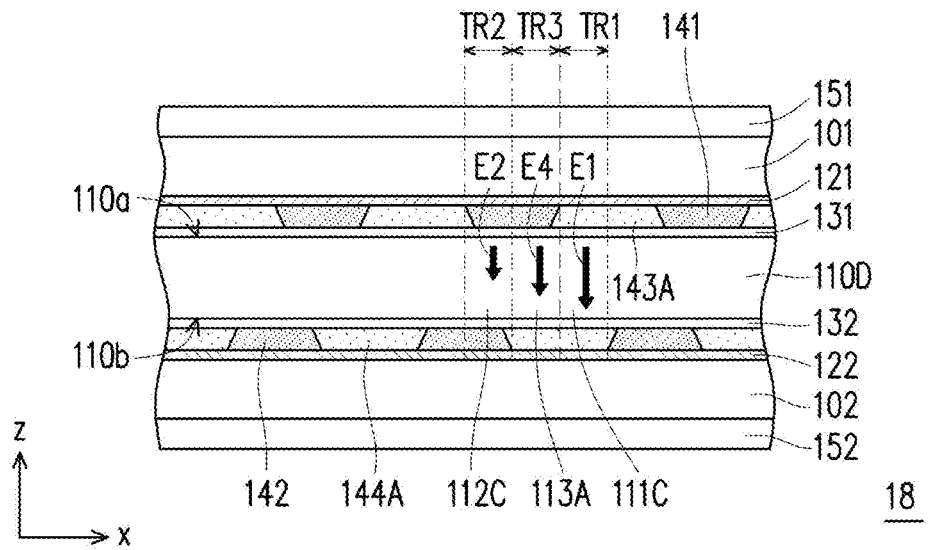
FIG. 11 is a cross-sectional view of an electronically-controlled viewing angle switching device according to an eighth embodiment of the invention.

FIG. 11 is a cross-sectional view of an electronically-controlled viewing angle switching device according to an eighth embodiment of the invention. Referring to FIG. 11, a main difference between the electronically-controlled viewing angle switching device 18 of the embodiment and the electronically-controlled viewing angle switching device 15 of FIG. 8 lies in a relative configuration relationship between the insulation patterns on the first substrate 101 and the insulation patterns on the second substrate 102 of the electronically-controlled viewing angle switching device 18. To be specific, the first insulation patterns 141 (or the third insulation patterns 143A) may be partially overlapped with the second insulation patterns 142 (or the fourth insulation patterns 144A) in the direction z. Namely, the first insulation patterns 141 may be misaligned with the second insulation patterns 142, and the third insulation patterns 143A may be misaligned with the fourth insulation patterns 144A. Through such misalignment relationship, the first transparent regions TR1, the second transparent regions TR2 and third transparent regions TR3 of the electronically-controlled viewing angle switching device 18 may be defined, and the third transparent regions TR3 are located between the first transparent regions TR1 and the second transparent regions TR2.

In the embodiment, when the first electrode 121 and the second electrode 122 are enabled, since the dielectric constant of the first insulation patterns 141 and the second insulation patterns 142 is greater than the dielectric constant of the third insulation patterns 143A and the fourth insulation patterns 144A, the two electrodes respectively generate an electric field E1, an electric field E2 and an electric field E4 with different strengths at the first transparent regions TR1, the second transparent regions TR2 and the third transparent regions TR3. To be specific, the strength of the electric field E2 formed between the overlapped first insulation pattern 141 and the second insulation pattern 142 may be less than the strength of the electric field E4 formed between the overlapped first insulation pattern 141 and the fourth insulation pattern 144A, and the strength of the electric field E1 formed between the overlapped third insulation pattern 143A and the fourth insulation pattern 144A may be greater than the strength of the electric field E4 formed between the overlapped first insulation pattern 141 and the fourth insulation pattern 144A.

Further, a strength difference of the electric fields formed by the two electrodes at the first transparent region TR1, the second transparent region TR2 and the third transparent regions TR3 results in different rotation extent of the liquid crystal molecules in the first portions 111C, the second portions 112C and the third portions 113A of the liquid crystal layer 110D at the transparent regions, so that the phase retardations generated by the first portions 111C, the second portions 112C and the third portions 113A of the liquid crystal layer 110D from the side viewing angle are different. Therefore, the respective transmittances (or light output amounts) of the first transparent regions TR1, the second transparent regions TR2 and the third transparent regions TR3 of the electronically-controlled viewing angle switching device 18 may be obviously different from the side viewing angle. For example, the first transparent regions TR1, the second transparent regions TR2 and the third transparent regions TR3 may be respectively dark regions, bright regions and slight bright regions, and the plurality of first transparent regions TR1, the plurality of second transparent regions TR2 and the plurality of third transparent regions TR3 of the electronically-controlled viewing angle switching device 18 may present the patterned interference image, so as to reduce the readability of the displayed image of the display panel (as shown in FIG. 1) from the side viewing angle to achieve the anti-peep effect.

It should be noted that since the first insulation patterns 141 and the third insulation patterns 143A are respectively misaligned with the second insulation patterns 142 and the fourth insulation patterns 144A, from the front viewing angle, through the difference of the refractive indexes of the second insulation patterns 142 and the fourth insulation patterns 144A, the difference of the refractive indexes of the first insulation patterns 141 and the third insulation patterns 143A may be partially compensated, so as to reduce visibility of the insulation pattern layer from the front viewing angle, and improve a visual taste of the display device in operation.

Figure 12:
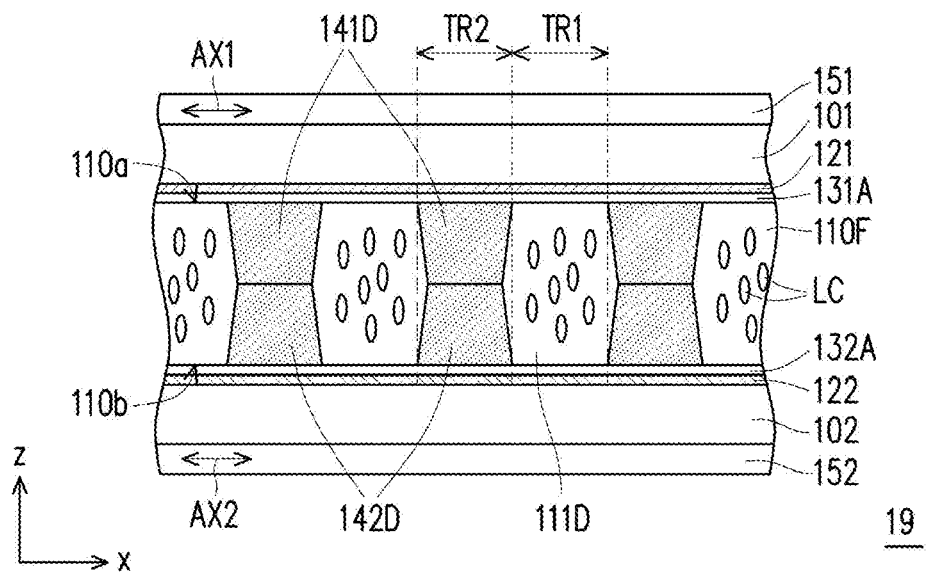
FIG. 12 is a cross-sectional view of an electronically-controlled viewing angle switching device according to a ninth embodiment of the invention.

FIG. 12 is a cross-sectional view of an electronically-controlled viewing angle switching device according to a ninth embodiment of the invention. Referring to FIG. 12, a main difference between the electronically-controlled viewing angle switching device 19 of the embodiment and the electronically-controlled viewing angle switching device 11 of FIG. 1 lies in a configuration relationship of the insulation patterns. In the embodiment, the first alignment film 131A and the second alignment film 132A are respectively disposed at the first side 110a and the second side 110b of the liquid crystal layer 110F, the first insulation patterns 141D and the second insulation patterns 142D are disposed between the first alignment film 131A and the second alignment film 132A, and the first insulation patterns 141D are located between the first alignment film 131A and the liquid crystal layer 110F, and the second insulation patterns 142D are located between the second alignment film 132A and the liquid crystal layer 110F, and the first insulation patterns 141D are selectively connected to the second insulation patterns 142D. Namely, a plurality of liquid crystal molecules LC of the liquid crystal layer 110F are substantially distributed between the two adjacent first insulation patterns 141D (or the second insulation patterns 142D) (i.e., the first transparent regions TR1). But the invention is not limited thereto, and in other embodiments, the first insulation patterns 141D and the first alignment film 131A may be arranged at intervals (or the second insulation patterns 142D and the second alignment film 132A may be arranged at intervals), i.e., the first insulation patterns 141D are disposed on the first electrode 121, and the first alignment film 131A is located at a region outside the first insulation patterns 141D, i.e., the first alignment film 131A is only disposed on the first electrode 121 corresponding to the first transparent regions TR1.

Since the second transparent regions TR2 are substantially occupied by the first insulation patterns 141D and the second insulation patterns 142D, the light beam incident to the second transparent regions TR2 may maintain its initial polarization state to pass through the first polarizer 151 regardless of the angle at which it is incident. Namely, regardless of whether the electronically-controlled viewing angle switching device 19 is enabled, the second transparent regions TR2 of the embodiment are always the bright regions. When the first electrode 121 and the second electrode 122 are enabled, the phase retardation generated by the first portions 111D of the liquid crystal layer 110F from the side viewing angle makes the first transparent regions TR1 to become the dark regions. In this way, the patterned interference image is formed. In the embodiment, the liquid crystal layer 110F may include a plurality of negative liquid crystal molecules LC, and the first alignment film 131A and the second alignment film 132A are vertical alignment films, but the invention is not limited thereto. Particularly, the vertical alignment films are used for arranging the plurality of negative liquid crystal molecules LC, so that an optical axis of the liquid crystal layer 110F and a normal direction (i.e. the direction z) of the substrate form an included angle less than 20 degrees.

Figure 13:
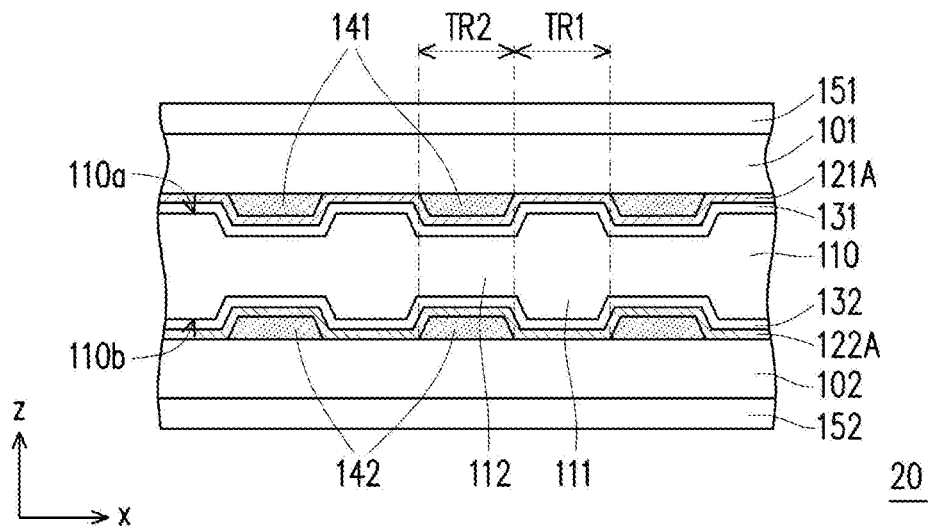
FIG. 13 is a cross-sectional view of an electronically-controlled viewing angle switching device according to a tenth embodiment of the invention.

FIG. 13 is a cross-sectional view of an electronically-controlled viewing angle switching device according to a tenth embodiment of the invention. Referring to FIG. 13, a main difference between the electronically-controlled viewing angle switching device 20 of the embodiment and the electronically-controlled viewing angle switching device 11 of FIG. 1 lies in a configuration relationship of the electrodes. To be specific, the first electrode 121A of the electronically-controlled viewing angle switching device 20 is disposed between the first insulation patterns 141 and the liquid crystal layer 110, and the second electrode 122A is disposed between the second insulation patterns 142 and the liquid crystal layer 110.

Through the above configuration relationship, a space between the first electrode 121A and the second electrode 122A in the second transparent region TR2 may be smaller than a space between the first electrode 121A and the second electrode 122A in the first transparent region TR1. When the two electrodes are enabled, an electric field strength of the second portions 112 of the liquid crystal layer 110 may be greater than an electric field strength of the first portions 111. Namely, in the embodiment, by forming an electric field strength distribution corresponding to the insulation patterns and a thickness distribution of the liquid crystal layer 110 between the two electrodes, the phase retardation of the first portions 111 of the liquid crystal layer 110 from the side viewing angle is different to the phase retardation of the second portions 112 from the side viewing angle.

Figure 14:
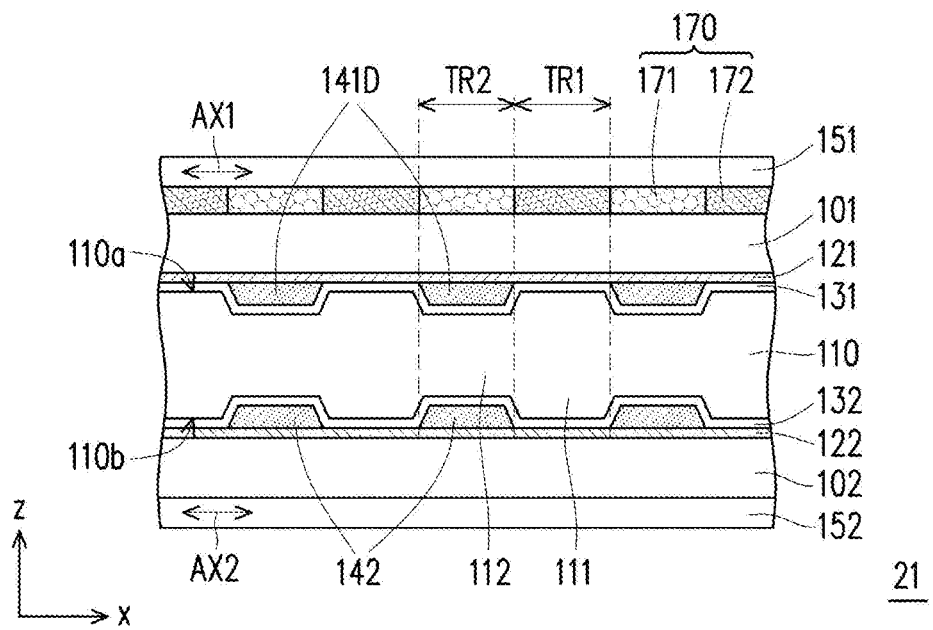
FIG. 14 is a cross-sectional view of an electronically-controlled viewing angle switching device according to an eleventh embodiment of the invention.

FIG. 14 is a cross-sectional view of an electronically-controlled viewing angle switching device according to an eleventh embodiment of the invention. Referring to FIG. 14, a main difference between the electronically-controlled viewing angle switching device 21 of the embodiment and the electronically-controlled viewing angle switching device 11 of FIG. 1 is that the electronically-controlled viewing angle switching device 21 further includes a phase retardation film. To be specific, the electronically-controlled viewing angle switching device 21 further includes a phase retardation film 170 between the first polarizer 151 and the second polarizer 152. In the embodiment, the phase retardation film 170 may be selectively disposed between the first polarizer 151 and the first substrate 101, but the invention is not limited thereto. In another embodiment, the phase retardation film 170 may also be disposed between the second polarizer 152 and the second substrate 102. In another embodiment, the phase retardation film 170 may also be disposed between the first substrate 101 and the liquid crystal layer 110, or between the second substrate 102 and the liquid crystal layer 110.

Further, the phase retardation film 170 may include a plurality of first portions 171 and a plurality of second portions 172, and the first portions 171 and the second portions 172 are arranged on the first substrate 101 in alternation along the direction x. Namely, the phase retardation film 170 may be a patterned phase retardation film, the first portions 171 of the phase retardation film 170 may be completely overlapped with the first insulation patterns 141 in the direction z, and the second portions 172 are located between two adjacent first portions 171. Namely, the first portions 171 and the second portions 172 of the phase retardation film 170 are respectively located in the second transparent regions TR2 and the first transparent regions TR1. When the electronically-controlled viewing angle switching device 21 is operated in the anti-peep mode (i.e., when the two electrodes are enabled), the configuration of the phase retardation film 170 may enlarge the phase retardation difference of the two transparent regions from an off-axis viewing angle. But the invention is not limited thereto, and in other embodiments, the phase retardation film 170 may be designed to compensate a transmittance difference of the first transparent regions TR1 and the second transparent regions TR2 from the side viewing angle through the configuration of the phase retardation film 170 when the electronically-controlled viewing angle switching device 21 is operated in a share mode (i.e., the two electrodes are not enabled), so as to improve the display quality of the display device from the side viewing angle.

In the embodiment, a difference between thickness direction phase retardations (i.e., Rth, out of plane phase retardation) of the first portions 171 and the second portions 172 of the phase retardation film 170 may be between 50 nm and 1000 nm. In a preferred embodiment, the difference of the thickness direction phase retardations (i.e., Rth) of the first portions 171 and the second portions 172 of the phase retardation film 170 may be between 200 nm and 400 nm. However, the invention is not limited thereto, and in other embodiments, the phase retardation film of the electronically-controlled viewing angle switching device 21 may also be a non-patterned phase retardation film, and the thickness direction phase retardation thereof may be between 250 nm and 600 nm. It should be noted that the thickness direction phase retardation (i.e., Rth) is a phase retardation generated by the phase retardation film 170 within a visible light wavelength range.

The number of the phase retardation film of the embodiment is, for example, one, but the invention is not limited thereto. In another embodiment, the electronically-controlled viewing angle switching device may also include two bi-axial plates (not shown), where one bi-axial plate is located between the first polarizer 151 and the liquid crystal layer 110, or between the first polarizer 151 and the first substrate 101, and another bi-axial plate is located between the second polarizer 152 and the second substrate 102. In the embodiment, the phase retardation film 170 is, for example, a C-plate, a negative C-plate, an A-plate, a bi-axial plate, an O-plate, or a composite plate composed of two A-plates whose optical axes intersect each other, but the invention is not limited thereto.

In summary, in the electronically-controlled viewing angle switching device and the display device of the embodiments of the invention, by configuring a plurality of insulation patterns to at least one side of the liquid crystal layer, an electric field strength distribution corresponding to the insulation patterns or a thickness distribution of the liquid crystal layer may be formed between the two electrodes, so that at least two parts of the liquid crystal layer have different phase retardations. In this way, the electronically-controlled viewing angle switching device may have a plurality of transparent regions corresponding to the insulation patterns, and transmittances of the transparent regions have larger differences from a side viewing angle, so as to form a patterned interference image, which avails improving an anti-peep performance of the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may use "first", "second", etc. followed with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronically-controlled viewing angle switching device, comprising:
a liquid crystal layer, having a first side and a second side opposite to each other;
a first electrode and a second electrode, respectively located at the first side and the second side of the liquid crystal layer;
a plurality of first insulation patterns, located at the first side of the liquid crystal layer; and
a plurality of second insulation patterns, located at the second side of the liquid crystal layer, wherein each of the first insulation patterns is at least partially overlapped with the corresponding second insulation pattern,
wherein material of the first insulation pattern and the second insulation pattern are transparent material, and each of the first insulation patterns is not connected to each of the second insulation patterns,
the first electrode is located on a side of the plurality of first insulation patterns away from the liquid crystal layer, the second electrode is located on a side of the plurality of second insulation patterns away from the liquid crystal layer, no electrode is disposed between the plurality of first insulation patterns and the liquid crystal layer, and no electrode is disposed between the plurality of second insulation patterns and the liquid crystal layer.

2. An electronically-controlled viewing angle switching device, comprising:
a liquid crystal layer, having a first side and a second side opposite to each other;
a first electrode and a second electrode, respectively located at the first side and the second side of the liquid crystal layer;
a plurality of first insulation patterns, located at the first side of the liquid crystal layer;
a plurality of second insulation patterns, located at the second side of the liquid crystal layer, wherein each of the first insulation patterns is at least partially overlapped with the corresponding second insulation pattern; and
a plurality of third insulation patterns, wherein the first insulation patterns and the third insulation patterns are arranged in alternation at the first side of the liquid crystal layer,
the first electrode is located on a side of the plurality of first insulation patterns away from the liquid crystal layer, the second electrode is located on a side of the plurality of second insulation patterns away from the liquid crystal layer, no electrode is disposed between the plurality of first insulation patterns and the liquid crystal layer, and no electrode is disposed between the plurality of second insulation patterns and the liquid crystal layer.

3. The electronically-controlled viewing angle switching device as claimed in claim 2, wherein each of the first insulation patterns has a first thickness in a direction, each of the third insulation patterns has a second thickness in the direction, and the first thickness is not equal to the second thickness.

4. The electronically-controlled viewing angle switching device as claimed in claim 2, wherein a dielectric constant of each of the first insulation patterns is not equal to a dielectric constant of each of the third insulation patterns, and each of the first insulation patterns has a first thickness in a direction, and each of the second insulation patterns has a second thickness in the direction, wherein the second thickness is less than 5 μm.

5. The electronically-controlled viewing angle switching device as claimed in claim 2, further comprising:

a refractive index matching layer, located at the first side of the liquid crystal layer, wherein the first insulation patterns and the third insulation patterns are located between the first electrode and the liquid crystal layer, and the refractive index matching layer is located at a side of the first electrode away from the liquid crystal layer.

6. The electronically-controlled viewing angle switching device as claimed in claim 5, wherein the refractive index matching layer comprises:
   a plurality of first matching portions, overlapped with the first insulation patterns; and
   a plurality of second matching portions, overlapped with the third insulation patterns, wherein a refractive index of each of the first insulation patterns is greater than a refractive index of each of the third insulation patterns, and a refractive index of each of the first matching portions is less than a refractive index of each of the second matching portions.

7. The electronically-controlled viewing angle switching device as claimed in claim 2, further comprising a plurality of fourth insulation patterns, wherein the second insulation patterns and the fourth insulation patterns are arranged in alternation at the second side of the liquid crystal layer.

8. The electronically-controlled viewing angle switching device as claimed in claim 7, wherein each of the second insulation patterns has a first thickness in a direction, each of the fourth insulation patterns has a second thickness in the direction, and the first thickness is not equal to the second thickness.

9. The electronically-controlled viewing angle switching device as claimed in claim 7, wherein a dielectric constant of each of the second insulation patterns is not equal to a dielectric constant of each of the fourth insulation patterns.

10. An electronically-controlled viewing angle switching device, comprising:
   a liquid crystal layer, having a first side and a second side opposite to each other;
   a first electrode and a second electrode, respectively located at the first side and the second side of the liquid crystal layer;
   a plurality of first insulation patterns, located at the first side of the liquid crystal layer;
   a plurality of second insulation patterns, located at the second side of the liquid crystal layer, wherein each of the first insulation patterns is at least partially overlapped with the corresponding second insulation pattern and material of the first insulation pattern and the second insulation pattern are transparent material; and
   a first alignment film and a second alignment film, respectively disposed at the first side and the second side of the liquid crystal layer, wherein the first insulation patterns are located between the first alignment film and the liquid crystal layer, and the second insulation patterns are located between the second alignment film and the liquid crystal layer,
   wherein the first alignment film is located between the first electrode and the first insulation patterns, the second alignment film is located between the second electrode and the second insulation patterns.

11. The electronically-controlled viewing angle switching device as claimed in claim 10, wherein the first insulation patterns are respectively connected to the second insulation patterns.

12. An electronically-controlled viewing angle switching device, comprising:—
   a liquid crystal layer, having a first side and a second side opposite to each other;
   a first electrode and a second electrode, respectively located at the first side and the second side of the liquid crystal layer;
   a plurality of first insulation patterns, located at the first side of the liquid crystal layer; and
   a plurality of second insulation patterns, located at the second side of the liquid crystal layer, wherein each of the first insulation patterns is at least partially overlapped with the corresponding second insulation pattern,
   wherein material of the first insulation pattern and the second insulation pattern are transparent material,
   wherein the first electrode is located between the first insulation patterns and the liquid crystal layer, and the second electrode is located between the second insulation patterns and the liquid crystal layer.

13. An electronically-controlled viewing angle switching device, comprising:
   a liquid crystal layer, having a first side and a second side opposite to each other;
   a first electrode and a second electrode, respectively located at the first side and the second side of the liquid crystal layer;
   a plurality of first insulation patterns, located at the first side of the liquid crystal layer;
   a plurality of second insulation patterns, located at the second side of the liquid crystal layer, wherein each of the first insulation patterns is at least partially overlapped with the corresponding second insulation pattern;
   a first polarizer and a second polarizer, respectively disposed at the first side and the second side of the liquid crystal layer; and
   at least one phase retardation film, disposed between the first polarizer and the second polarizer, and comprising:
      a plurality of first portions, overlapped with the first insulation patterns; and
      a plurality of second portions, located between the first portions,
   wherein a difference between a thickness direction phase retardation of each of the first portions and a thickness direction phase retardation of each of the second portions is in a range of 200 nm to 400 nm.

14. A display device, comprising:
   a display panel; and an electronically-controlled viewing angle switching device, overlapped with and disposed on the display panel, and comprising:
      a liquid crystal layer, having a first side and a second side opposite to each other;
      a first electrode and a second electrode, respectively located at the first side and the second side of the liquid crystal layer;
      a plurality of first insulation patterns, located at the first side of the liquid crystal layer; and
      a plurality of second insulation patterns, located at the second side of the liquid crystal layer, wherein each of the first insulation patterns is at least partially overlapped with the corresponding second insulation pattern,
   wherein material of the first insulation pattern and the second insulation pattern are transparent material, and each of the first insulation patterns is not connected to each of the second insulation patterns,
   the first electrode is located on a side of the plurality of first insulation patterns away from the liquid crystal layer, the second electrode is located on a side of the plurality of second insulation patterns away from the liquid crystal layer, no electrode is disposed between the plurality of first insulation patterns and the liquid crystal layer, and no electrode is disposed between the plurality of second insulation patterns and the liquid crystal layer.

15. An electronically-controlled viewing angle switching device, comprising:
   a liquid crystal layer, having a first side and a second side opposite to each other;
   a first electrode and a second electrode, respectively located at the first side and the second side of the liquid crystal layer;
   a plurality of first insulation patterns, located at the first side of the liquid crystal layer; and
   a plurality of second insulation patterns, located at the first side of the liquid crystal layer, wherein the first insulation patterns and the second insulation patterns are arranged in alternation at the first side of the liquid crystal layer, a dielectric constant of each of the first insulation patterns is not equal to a dielectric constant of each of the second insulation patterns.

* * * * *